United States Patent
Hart

(10) Patent No.: US 10,834,235 B2
(45) Date of Patent: Nov. 10, 2020

(54) SYSTEMS AND METHODS FOR APPLICATION INTEGRATIONS

(71) Applicant: Verified First LLC, Boise, ID (US)

(72) Inventor: Ryan Andrew Hart, Boise, ID (US)

(73) Assignee: Verified First LLC, Boise, ID (US)

( * ) Notice: Subject to any disclaimer, the term of this patent is extended or adjusted under 35 U.S.C. 154(b) by 0 days.

(21) Appl. No.: 16/599,013

(22) Filed: Oct. 10, 2019

(65) Prior Publication Data

US 2020/0045137 A1 Feb. 6, 2020

Related U.S. Application Data

(63) Continuation of application No. 16/389,691, filed on Apr. 19, 2019, which is a continuation-in-part of application No. 15/814,241, filed on Nov. 15, 2017, now Pat. No. 10,331,502, which is a continuation of application No. 15/811,534, filed on Nov. 13, 2017, now abandoned.

(60) Provisional application No. 62/421,961, filed on Nov. 14, 2016.

(51) Int. Cl.

| G06F 9/44 | (2018.01) |
| H04L 29/08 | (2006.01) |
| G06F 16/954 | (2019.01) |
| G06F 9/445 | (2018.01) |
| G06F 16/958 | (2019.01) |

(52) U.S. Cl.
CPC .............. *H04L 67/34* (2013.01); *G06F 9/445* (2013.01); *G06F 16/954* (2019.01); *G06F 16/972* (2019.01)

(58) Field of Classification Search
None
See application file for complete search history.

(56) References Cited

U.S. PATENT DOCUMENTS

| 2004/0002944 A1 | 1/2004 | Hauser et al. |
| 2004/0006653 A1 | 1/2004 | Kamen et al. |
| 2005/0050228 A1 | 3/2005 | Perham et al. |
| 2011/0161985 A1 | 6/2011 | Witte et al. |
| 2015/0160797 A1 | 6/2015 | Shearer et al. |
| 2016/0217488 A1 | 7/2016 | Ward et al. |
| 2017/0098200 A1 | 4/2017 | Merg et al. |

(Continued)

OTHER PUBLICATIONS

"Background Check API: Integrate Hireright for Human Capital Management", https://blog.cloud-elements.com/background-check-api-integrate-hireright-for-human-capital-management, Posted Feb. 17, 2016, visited Feb. 2, 2018.

(Continued)

*Primary Examiner* — Craig C Dorais
(74) *Attorney, Agent, or Firm* — Stoel Rives LLP; R. Whitney Johnson; Nathan S. Searcy

(57) ABSTRACT

Systems and methods are disclosed for integrating with third-party applications. An extension module operates with a user interface application on a client computing device. The extension module enables integration of functionality of an associated middleware system. The extension module extracts data from a user interface of a third-party application system based on a regular expression template. The extension module transmits data to the middleware system and receives information from the middleware system. The extension module can alter at least a portion of the user interface based on the information received from the middleware system.

20 Claims, 11 Drawing Sheets

(56) References Cited

U.S. PATENT DOCUMENTS

2017/0286188 A1    10/2017   Wang et al.
2018/0101895 A1    4/2018   Buckles et al.

OTHER PUBLICATIONS

"HireRight Announces HireRight Connect Integration Platform", https://www.hireright.com/news/press-release/hireright-announces-hireright-connect-integration-platform/, copyright 2005-2018, visited Feb. 2, 2018.

"Hireright API Integration, Simplified.", https://cloud-elements.com/elements/hireright-api/, visited Feb. 2, 2018.

"HireRight Connect", https://www.hireright.com/hireright-connect/, copyright 2005-2018, visited Feb. 2, 2018.

"HireRight Delivers First Employment Screening Solution to Achieve Oracle Validated Integration with Oracle's PeopleSoft Enterprise Human Capital Management 9.1", http://cloudcomputing.sys-con.com/node/1431172, Jun. 14, 2010, visited Feb. 2, 2018.

Hart , Non-Final Office Action dated Oct. 4, 2018 in U.S. Appl. No. 15/814,241.

Hart , Notice of Allowance dated Jan. 31, 2019 for U.S. Appl. No. 15/814,241.

Hart , Office Action dated Jun. 12, 2020 for U.S. Appl. No. 16/389,691.

SYSTEMS AND METHODS FOR APPLICATION INTEGRATIONS

RELATED APPLICATIONS

This patent application is a continuation of U.S. patent application Ser. No. 16/389,691, entitled SYSTEMS AND METHODS FOR INTEGRATING WITH APPLICATIONS, filed Apr. 19, 2019, which is a continuation-in-part of U.S. patent application Ser. No. 15/814,241, entitled SYSTEMS AND METHODS FOR INTEGRATING WITH APPLICATIONS, filed Nov. 15, 2017, which is a continuation of U.S. patent application Ser. No. 15/811,534, entitled SYSTEMS AND METHODS FOR INTEGRATING WITH APPLICATIONS, filed Nov. 13, 2017, which claims the benefit under 35 U.S.C. § 119(e) of U.S. Provisional Application No. 62/421,961, entitled SYSTEMS AND METHODS FOR INTEGRATING WITH APPLICATIONS, filed Nov. 14, 2016, each of which is hereby incorporated by reference in its entirety.

TECHNICAL FIELD

The present disclosure relates to systems and methods for interfacing and/or integrating with one or more disparate applications or application systems. In particular, the present disclosure relates to systems and methods for interfacing and/or integrating with a third-party application system via data exported from the third-party system webpage or other user interface.

DETAILED DESCRIPTION OF PREFERRED EMBODIMENTS

Figure 1:
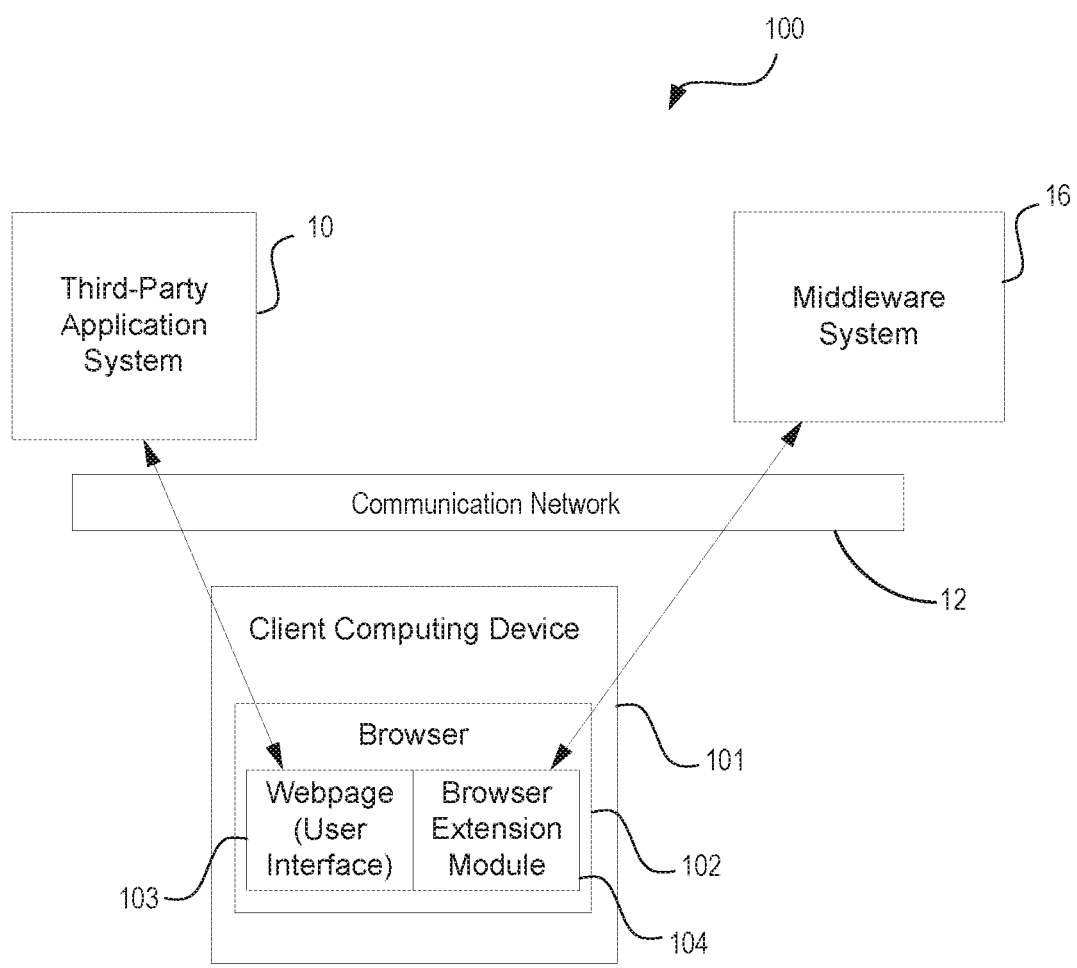
FIG. 1 is a system diagram of a system for integrating with a third-party application system, according to one embodiment.

Companies frequently use applicant tracking software (ATS), payroll software, human capital management software, healthcare information management software, or other software tracking employees or applicants (collectively referred to herein as third-party applications or third-party systems). Oftentimes, the various third-party applications integrate with a vendor service to provide other services in addition to the services provided by the third-party applications. For example, some third-party applications may integrate with a vendor, based on a customer request, to provide the ability to order a report on a person, such as a background check, directly within the third-party applications.

However, the provider of a given third-party application generally controls which vendors are allowed to integrate into the given third-party application. Examples of vendor-provided services include performance of background checks, credit report checks, personality assessments, video interviewing, I-9 employment verification/validation, drug screening, etc. Third-party applications may not integrate with particular vendors, such as if the third-party application already is integrated with enough vendors to satisfy customers' needs. Further, third-party applications may have a preferred partnership, potentially revenue sharing, with a particular vendor, and therefore may not allow other vendors to integrate with their third-party application. Third-party applications also generally include a connection fee that the customer must pay to receive access to the vendor services through the third-party applications.

Integration between third-party application providers and vendors often takes an extended period of time and runs a risk of either the third-party application provider or the vendor backing out of the integration. Further, vendors are required to be proficient in multiple third-party applications to integrate and build the vendor systems to operate properly and appropriately within the third-party applications. This may require a vendor to build to the third-party applications' specifications, configure to the third-party applications' specifications, and support the client using that third-party applications' integration. It may be desirable to have a standard integration across all of the third-party application platforms. That is, it may be desirable to bypass third-party application integration and/or permission. Embodiments of the present disclosure allow a customer to access a vendor service from within a third-party application or third-party application platform without integration between the third-party application and the vendor service.

A client can refer to an entity, such as a company or corporation, which may establish a relationship with another entity whereby the second entity, in exchange for monetary or other consideration, provides a service to the first entity.

A client user may refer to an employee of a client acting on behalf of the client/employer.

A transaction may be an interaction between a client and a service provider whereby the service provider may provide a service to the client in exchange for monetary or other consideration. More particularly, a transaction in the scope of the disclosure is a data exchange between client and service provider which may incur a financial charge against the client and in favor of the service provider for the provision of a data service, such as in a software-as-a-service (SAAS) model.

A control component refers to a set of instructions in machine readable format and corresponding display artifact(s), the combination of which provides a user with a means to interact with a page displayed on a computing device display to trigger a pre-defined behavior. By way of example without limitation, a control component may include text, a hypertext link, one or more variables, regular expressions, input style instructions (such as, among others, radio-button, check box, numeric field, text field, etc.), graphical components such as buttons or icons, behavior controls (such as on load, on hover, on click, etc., or the equivalents in any relevant code or markup language), code or markup elements, etc. Examples of user interactions with the control component include hover (or hover on, mouse enter, etc.) (wherein the user places a cursor, such as a mouse cursor) within a defined region for the control component, click (wherein the user places the cursor within a defined region for the control component and presses a physical button, such as a mouse button or a key on a keyboard), hover off or mouse leave (wherein the user causes the cursor to leave a defined region of the control component). Examples of behavior include without limitation load another page; reload the current page (refresh); send data to a defined recipient, such as another user, or a fully qualified network address (iPV4, iPV6 or other computing device identifier, port identifier, etc.); menu display; submenu display; etc.

An application may refer generally to a software system installed on a computing device, or a computing device network, to execute programmatic instructions and other computing functions. Examples of applications include word processors, accounting packages, games, etc.

An applicant may refer generally to a real person, a human, seeking employment with a company, corporation, or other entity. More particularly, an applicant can be a person seeking employment with a client as defined above.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail to avoid obscuring aspects of the embodiments. Furthermore, the described features, structures, or characteristics may be combined in any suitable manner in one or more embodiments.

FIG. 1 is a system diagram of a system 100 for integrating with third-party applications, according to one embodiment. The system 100 for integrating with third-party applications is a system for a vendor service to interface with a third-party application system 10. More particularly, the system 100 for integrating with third-party applications is a system for a vendor service (e.g., via a middleware system 16) to interface with a third-party application system 10 providing a user interface 103 to/on a client computing device 101. The system 100 for integrating with third-party applications includes at least the client computing device 101 having a browser 102 and in communication via a communication network 12 with the third-party application system 10 and a middleware system 16.

The client computing device 101 includes at least the browser 102 and the browser extension module 104. The browser 102 may be a software application (or a layer or module of a software application) resident on the client computing device 101 serving as the user interface 103 between a user and the third-party application system 10. For ease of convenience, the description herein refers to using services, protocols, applications, etc., generally related to the Internet; however, any appropriate network schema, protocols, etc., may be employed. The browser 102 may be a publicly available so-called "Internet browser" or "World Wide Web browser," such as, for example, e.g., a Chrome™ browser, Internet Explorer® browser, Safari® browser, Fire-Fox® browser, etc., or the browser 102 may be a user interface module or layer of a software application provided in conjunction with the third-party application system 10.

The system 100 for integrating with third-party applications includes the browser extension module 104 to operate with the user interface 103 or similar application (e.g. browser 102) on the client computing device 101. The browser extension module 104 is associated with the middleware system 16. The browser extension module 104 may integrate with, or connect to, the browser 102 on the client computing device 101. In one embodiment, the user interfaces 103 of the system 100 for integrating with third-party application system may include both the browser 102 and the browser extension module 104. The browser extension module 104 may integrate through the browser 102 with the user interface 103 without interacting directly with the third-party application system 10. In other words, the browser extension module 104 may access information provided to the user interface 103 by the third-party application system 10 even though the browser extension module 104 does not necessarily communicate with the third-party application system 10. In at least one embodiment, the browser extension module 104 may allow a client user to access an unintegrated vendor service (e.g. via the middleware system 16) while remaining on (e.g., or from within the context of) a third-party application system 10 user interface 103 (such as, for example, a webpage). In another embodiment, the browser extension module 104 may allow a client user to access the same or similar functionality with the vendor service (middleware system 16) integrated to the third-party application system 10. In other words, the middleware system 16 may be autonomous from the third-party application system 10, or the middleware system 16 may be integrated to, or contiguous, with the third-party application system 10. (In such an embodiment, integrated or contiguous includes, for example, the concept of distributed computing.) In yet another embodiment, the functionality of the middleware system 16 may be fully integrated within the architecture of the third-party application system 10 such that the service of the middleware system 16 is an available service within the third-party application system 10. The browser extension module 104 of the system 100 for integrating with third-party applications on the client computing device 101 may extract data from the user interface 103 of the third-party application system 10 based on a regular expression template. The browser extension module 104 may transmit data from the client computing device 101 to the middleware system 16, and may receive information from the middleware system 16. The browser extension module 104 may also alter or update at least a portion of the user interface 103 (or browser 102) based on the information received from the middleware system 16. The user interface 103 on the client computing device 101 may allow communication via the communication network 12 with the third-party application system 10 to request and retrieve information from the third-party application system 10, and to display the returned information via the user interface 103, while the browser extension module 104 may access the information returned from the third-party application system 10 to the user interface 103. The system 100 for integrating with a third-party application can enable interfacing with information from the third-party application system 10, via the user interface 103, while not communicating with a back-end computing device (e.g., a server) of the third-party application system 10. The browser extension module 104 may be installed or otherwise integrated into the Internet browser 102 by presenting a control object or other interface within the user interface 103 of the third-party application system 10.

The browser extension module 104 may include a library of regular expression templates, as will be described more fully below with reference to FIG. 4. Each regular expression corresponds to a third-party application system 10. The browser extension module 104 may select or obtain a regular expression template based on one or more characteristics of a webpage that is provided to the client computing device 101 by the third-party application system 10. The browser extension module 104 scans each electronic document, such as, for example, an Internet webpage, displayed in the user interface 103 for each internet site a client user visits to determine if the webpage is a third-party application system 10 user interface 103. For example, the browser extension module 104 may identify a Uniform Resource Indicator (URI), such as a Uniform Resource Locator (URL), of a presented webpage. In another embodiment, the browser extension module 104 may first identify a target URI or URL, then scan for the presence of one or additional characteristics, such as the presence of known variable expression(s). If the URI or URL is one associated with the third-party application system 10 (and, where appropriate, the one or more other characteristic(s) may be found), the browser extension module 104 can use the corresponding regular expression template configured or otherwise determined for that webpage to scan for and identify information. The regular expression template can determine and/or specify which fields in the webpage to parse to identify and extract and/or export the desired information and data. For example, the regular expression template of a known third-party application system 10 user interface 103 may be configured to identify which fields provide the data needed for a report to be compiled from the middleware system 16 (and/or a vendor service). For example, the regular expression template may identify which fields provide, for example, a name of a person, a physical address, an email address, date of birth, a social security number, etc., and extract and/or export that data. At least some of the data is extracted or otherwise exported to automatically populate data fields in the browser extension module 104. For example, the browser extension module 104 may automatically populate with a person's name and email address and provide a control component for a client user to order a report on the person from the middleware system 16, as discussed in more detail below. The embodiments, however, are not limited to only populating a name and email address. Any information parsed from fields of a third-party application system 10 user interface 103 may be automatically populated to corresponding fields of the browser extension module 104.

The browser extension module 104 may communicate via the communication network 12 with the middleware system 16. The middleware system 16 may provide one or more additional services that augment the service provided by the third-party application system 10. In other words, the middleware system 16 may be a vendor service or vendor service system to provide data service(s) related to but distinct from the data service(s) nominally available through the third-party application system 10. The middleware system 16 provides these services without direct integration with the third-party application system 10. In at least one embodiment, the middleware system 16 provides service independent from, but in the context of, the third-party application system 10 via the browser extension module 104.

In at least one embodiment, the middleware system 16 may be hosted on a communication network 12 remote to the client computing device 101 hosting the system 100 for integrating with third-party applications. In another embodiment, the middleware system 16 may be hosted on a network which also hosts the client computing device 101.

The middleware system 16 can be accessed through the communication network 12 by the browser extension module 104. For example, the middleware system 16 may be stored, implemented, and/or otherwise operating on a remote computing device. The remote computing device can also be distinct and/or remote from the third-party application system 10. The browser 102 and the browser extension module 104 may be hosted and/or executed on a client user's system, which may be a client computing device 101.

Once the browser extension module 104 has extracted data from the user interface 103 of the third-party application system 10, the browser extension module 104 may transmit the data to the middleware system 16. The browser extension module 104 may also receive information from the middleware system 16. The browser extension module 104 may modify at least a portion of the user interface 103 based on the information received from the middleware system 16.

Figure 2:
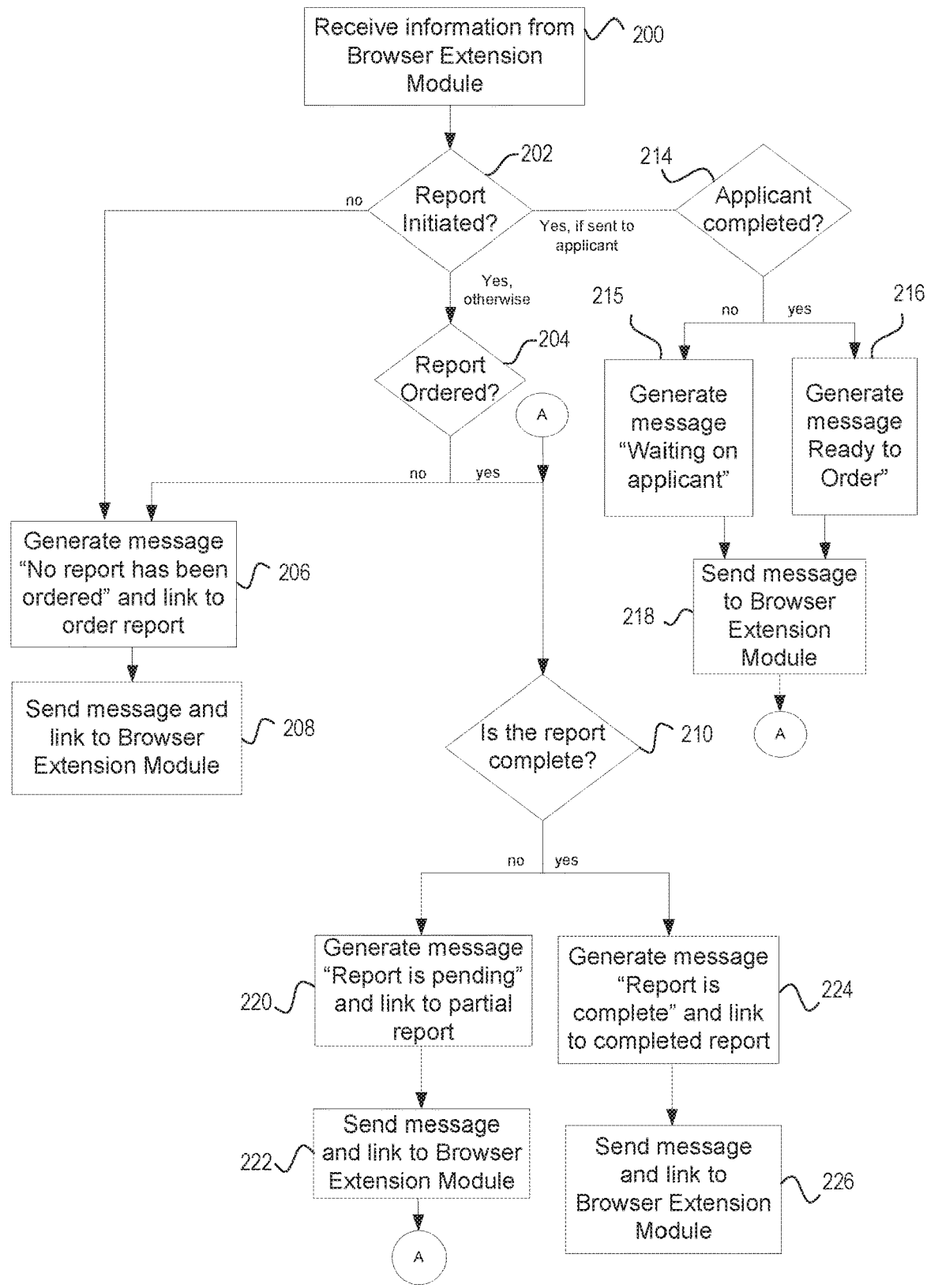
FIG. 2 is a flow chart illustrating a process of a middleware system, according to one embodiment.

FIG. 2 illustrates a flowchart for the operation of the middleware system 16. The middleware system 16 receives 200 the data from the browser extension module 104 and determines 202 if a report has been initiated based on the data. Reports are initiated when completed forms from a person, such as an application form, have been received. In some embodiments, the forms are received in the middleware system 16 through a push notification (e.g., email notification, SMS notification, desktop notification, mobile app notification). In at least one embodiment, an applicant may be invited to complete the form(s) which may lead to report initiation 202. If a determination 202 is made that the report has not been initiated, then the middleware system 16 generates 206 and sends 208 a message to the browser extension module 104 with a control component to enable a user to order a report.

In at least one embodiment, a client user may enter the data which may lead to report initiation 202. If the report has been initiated and invitation is sent to an applicant to provide information (e.g., see input component 758*a* in FIG. 7C), the middleware system 16 determines 214 if enough data has been entered to prepare a report. If enough information has been entered, the middleware system 16 generates 216 a message that the report is ready to order and a control component to order the report, then sends 218 the message and the control component to the browser extension module 104. If there is insufficient information to initiate a report, the middleware system generates 215 a message that the middleware system 16 is waiting on the applicant, then the middleware system 16 sends 218 the message to the browser extension module 104.

If the report was initiated 202 by a client entering the requisite information (e.g., see input component 758*b* in FIG. 7C), or otherwise initiated by a client, the middleware system 16 determines 204 whether the report has been ordered. If the report has not been ordered, the middleware system 16 generates 206 and sends 208 a message to the browser extension module 104 with a control component to enable a user to order a report.

If a report has been ordered, the middleware system 16 determines 210 if the report is complete. If the report is complete, the middleware system 16 generates 224 a message that the report is complete and a control component (or link) to enable the client user to view the report, then the middleware system 16 sends 226 the message and the control component to the browser extension module 104. If the report is not complete, the middleware system 16 generates 220 a message that the "Report is pending" and a control component to enable the client user to view the partial report. Then the middleware system 16 sends 222 the message and the control component to the browser extension module. The middleware system 16 may then continue to monitor or otherwise periodically check (e.g., upon subsequent execution of the method 200) whether the report is complete. In some embodiments, when the middleware system 16 determines 214 the report is waiting on the applicant, the middleware system 16 may generate a waiting-on-applicant message with a control component to enable the end user to re-invite the applicant to complete information entry, and the pending-report message and the control component to enable the client user to view the partial report, then the middleware system sends 218 the message and the control components to the browser extension module 104.

The completed report and partial report may be accessed or otherwise provided in any format, including but not limited to, a portable document format (PDF), an Extension Markup Language (XML) file format, or Hyper Text Markup Language (HTML) file format. If the client user is no longer on (e.g., accessing or viewing) the third-party application system 10 user interface 103, the middleware system 16 may also send the message and control component to the client user by push notification (e.g., by email, SMS text, desktop notification, app notification) to notify the client user the report is complete.

Figure 3:
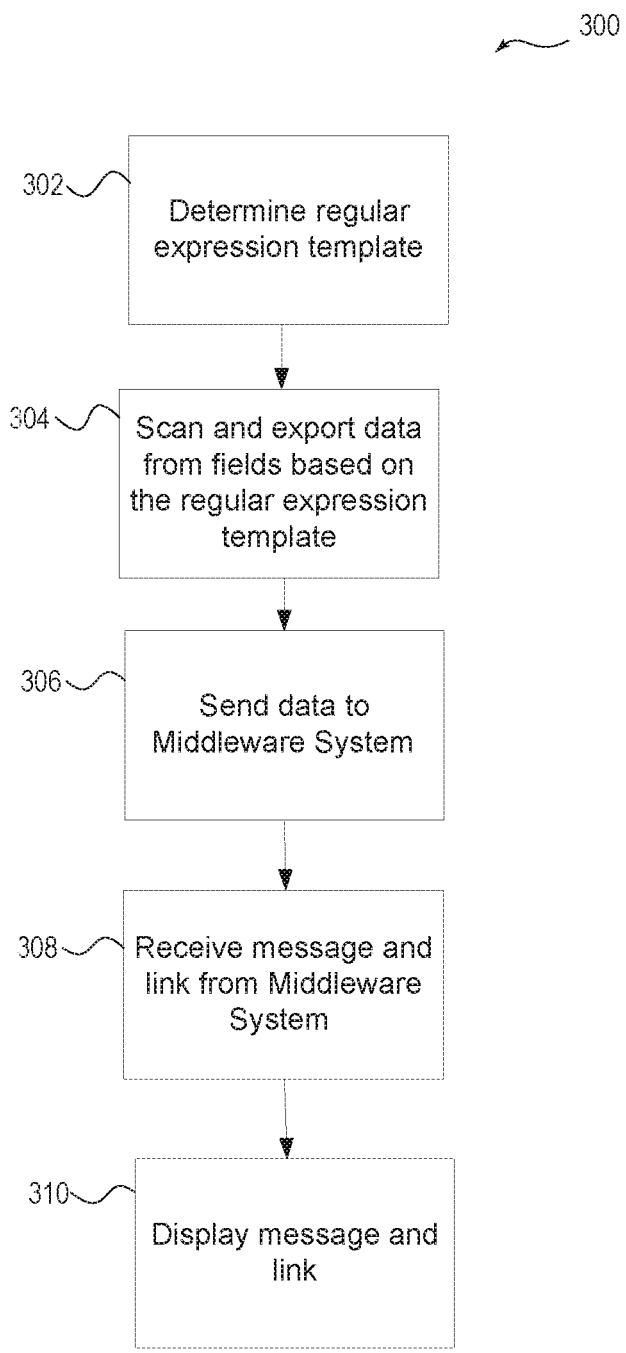
FIG. 3 is a flow chart illustrating a process of a browser extension module, according to one embodiment.

FIG. 3 illustrates a flowchart of a method 300 of operation of a browser extension module (such as the browser extension module 104 of FIG. 1). The browser extension module 104 can determine 302 a regular expression template needed to scan the webpage presented by the browser. For example, the browser extension module 104 may analyze a URI or URL of the webpage to determine if an action should be taken (e.g., if an integration with the webpage or other user interface is desirable to interface with the associated third-party application or application system 10). The browser extension module 104 may obtain a regular expression template (e.g., such as from a database or other data store) based on the URL of the webpage. The browser extension module 104 can use the regular expression template to recognize specific data (e.g., text, images, values, fields) of the webpage (e.g., within the webpage HTML code). The browser extension module 104 may scan and export 304 data of the webpage based on the regular expression template. The browser extension module 104 sends 306 the data to a middleware system (such as the middleware system 16 of FIG. 1). The browser extension module 104 then receives 308 a message and control component from the middleware system 16 and displays 310 the message and control component to the client user.

The browser extension module 104 may change its icon (not shown, but see 660 in FIG. 6B) based on the message and/or control component received from the middleware system 16. For example, the browser extension module icon may turn gray if no report is ordered, yellow if a report is pending, and green if the report is completed. This allows a client user to quickly determine the status of a report for a person who is listed currently in the third-party application user interface 103 by merely looking at the icon 660 of the browser extension module 104.

The browser extension module 104 may also modify the third-party application user interface 103 or the browser extension module 104 to include the message and/or control component received from the middleware system 16 to enact the next step in the process based on the status. The message may include hypertext markup language (HTML) to inject the message on the user interface of the third-party system that is being presented to a user. The message and/or control component may be presented as a button, for example, that a user can press (e.g., click). The message and/or control component may say, for example, "Order Background Check," if a report has not yet been ordered; "Results pending" if the report is not yet complete; or "View Results," if the report is complete. The client user may select the control component, and the control component will perform the desired function based on the status of the report. For example, the control component will either order the background check or show the results of the report to the user. In some embodiments, if the report is pending, the control component may allow a user to make modifications to the ordered report or see a partial report. In other embodiments, a message is sent without a control component if the report is pending.

When the browser extension module 104 receives 308 the message and control component from the middleware system 16 to order a report, the client user is presented with two options if the client user selects to order a report. The client user may elect to email (or other push notification, such as SMS text message) the applicant for authorization or perform an instant order. If the client user elects to email the applicant, the middleware system 16 generates and sends an email to the applicant based on the data to complete the disclosure and authorization forms, as well as enter any necessary personal identifying information. Once the applicant completes their forms, the middleware system 16 gathers the necessary information to prepare the report. If the client user selects perform an instant report, the browser extension module 104 requests the client user to verify that the client user has collected the necessary signed forms from the person, as well as the person's identifying information, which may be pulled directly from the third-party application user interface 103 using a regular expression template, as discussed above. If the client user cannot verify the necessary signed forms have been collected, an error message may be presented by the browser extension module 104 either on the browser extension module 104 or the third-party application user interface 103. If the client user does verify the necessary signed forms have been collected, a report is ordered without including the applicant in the process.

When the client user orders the report, the browser extension module 104 sends the data as well as the URL of the third-party application user interface 103 to the middleware system 16. The message and control component generated by and sent from the middleware system 16 will include the URL sent from the browser extension module 104. The control component opens the URL the client user originally ordered the search from and opens the browser extension module 104 to view the results.

The browser extension module 104 may also include different sections, to see results of recent searches ordered. These recent searches may be separated by pending and completed orders. The client user can use the tabs to turn on or off additional services, such as monitoring. The browser extension provides full functionality of the vendor services, as if accessing a direct portal to the vendor service system.

The middleware system 16 may have the ability to monitor an applicant's personal identifying information and file number from a previous report and be alerted if a new data point relevant to the report is located. The client user may then be notified through email and/or the browser extension module 104 may present the option to the client user to rerun the report. The browser extension module 104 may limit the ability to select monitoring of the application to an administrative account, since this monitoring service may cost an additional amount of money. In another embodiment, applicant monitoring may be triggered (or de-triggered) based upon the stage of the applicant. For example, monitoring may be triggered once an applicant moves from an initial stage to a more advanced stage, or may be de-triggered by demoting an applicant (setting a "reject" flag, for example).

To use the browser extension module 104, a client user may be required to have an account. An administrator of the middleware system 16 can create, modify and delete client accounts and client users, as needed. For example, for a new client, the administrator can create an account for the client, subaccount, packages, positions, and locations, and add client users to the client account. Each client user may be required to have a username and password to access the account, including administrative client users. The administrator of the middleware system 16 can perform searches on client accounts and what reports have been ordered. The administrator of the middleware system 16 can also search the middleware system 16 by names, emails, and file numbers, or other data. If data is not available in the middleware system 16 to create a report, then the middleware system 16 may communicate with an outside source to receive data to use in the preparation of a report. In some embodiments, the middleware system 16 may obtain additional information via an API of an outside service, including accessing an API for the third-party application system 10.

An example use case of the system 100 for integrating with third-party applications is as follows. A client user may be on a third-party application system user interface 103 looking at information regarding an applicant. The browser extension module 104 scans the user interface 103 and exports data from fields determined from a regular expression template and send this information to the middleware system 16. The middleware system 16 determines whether a report has been ordered for that user and sends a message and control component back to the browser extension module 104 based on the determination. The browser extension module 104 may modify its icon 660 (in FIG. 6B), its control component 752 (in FIG. 7B), 752*a*, 752*b*, etc. (in FIG. 7C), 772 (in FIG. 7D), or a combination thereof, or the third-party application user interface (602 in FIGS. 6A-6B, 702 in FIGS. 7A-7D) based on the message and control component received from the middleware system 16. The client user may then see whether a report has been ordered. If a report has not been ordered, the client user can quickly press the control component to order a search. The information that is sent to the middleware system 16 is displayed to the client user. The data and information sent to the middleware system 16 includes a URL of the user interface 103 of the third-party application system 10 that the data was exported from. When the results are available, the middleware system 16 may email the client user (or otherwise send notification) to alert them of the completed report with a control component that takes the client user to the URL of the user interface 103 of the third-party application system 10 the user was on when the report was ordered, as well as displaying the report in the browser extension module 104 or on the third-party application system user interface 103 itself.

Some third-party application systems 10 do not control which vendors provide integration with the third-party application system 10 and allow vendors to develop their own solutions and publish them to a marketplace of the software to be integrated into the third-party application system 10. In such embodiments, an application of the browser extension system (e.g., system 100) may be configured to interact with data in the third-party application system 10, allowing a client to build their own custom packages, create automated workflows to order services, and receive results directly back into the third-party application system 10. The middleware system 16 may return, per a client's specification, an adjudication result which uses an employer's hiring matrix to determine what data on a report indicates a hirable or not-hirable applicant. This may be returned as a field that can be used to automate workflow for the client user. Thus, the application allows a client user to have both ordering and taking action on the results be an automated process.

The browser extension module 104 provides data to the middleware system 16 based on the type of report to be run. Different data may be provided based on the different types of reports. Reports may include, by way of example without limitation, background checks, credit reports, employment verification, education verification, professional license verification, driver's license verification, Department of Motor Vehicles information, social security number trace, or a personality assessment.

Figure 4:
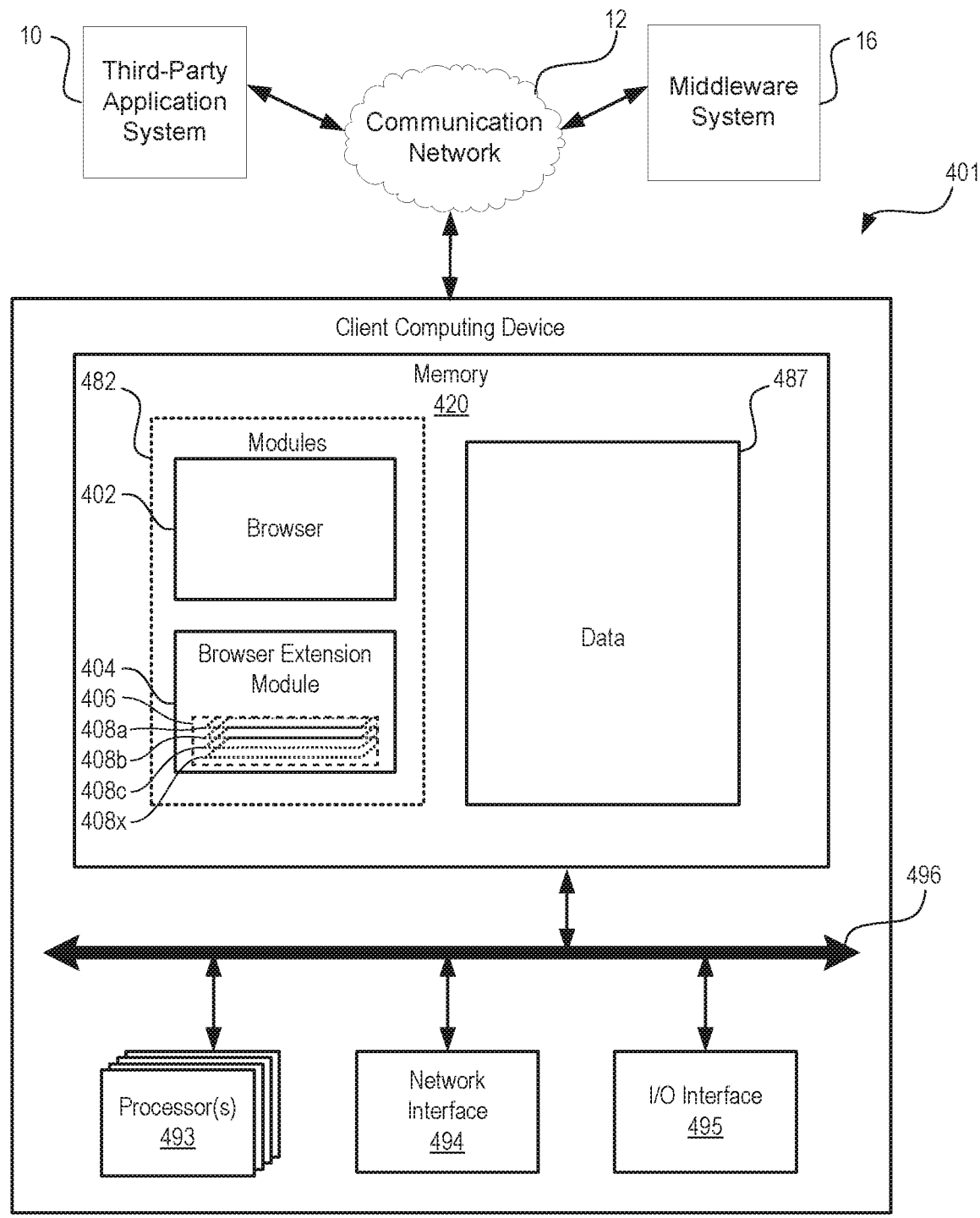
FIG. 4 is a block diagram of a client computing device, according to one embodiment.

FIG. 4 is a block diagram of a client computing device 401 according to one embodiment. The client computing device 401 can include a memory 420, one or more processors 493, a network interface 494, an input/output interface 495, and a system bus 496. The memory 420 of the client computing device 401 may include a browser 402 and a browser extension module 404.

The one or more processors 493 may include one or more general purpose devices, such as an Intel®, AMD®, or other standard microprocessor. The one or more processors 493 may include a special purpose processing device, such as ASIC, SoC, SiP, FPGA, PAL, PLA, FPLA, PLD, or other customized or programmable device. The one or more processors 493 can perform distributed (e.g., parallel) processing to execute or otherwise implement functionalities of the presently disclosed embodiments. The one or more processors 493 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 420 may include static RAM, dynamic RAM, flash memory, one or more flip-flops, ROM, CD-ROM, DVD, disk, tape, or magnetic, optical, or other computer storage medium. The memory 420 may include a plurality of program engines and/or modules 482 and program data 487. The memory 420 may be local to the client computing device 401, as shown, or may be distributed and/or remote relative to the client computing device 401.

The program engines 482 may include all or portions of other elements of the client computing device 401. The program engines 482 may run multiple operations concurrently or in parallel with or on the one or more processors 493. In some embodiments, portions of the disclosed modules, components, and/or facilities are embodied as executable instructions embodied in hardware or in firmware, or stored on a non-transitory, machine-readable storage medium, such as the memory 420. The instructions may comprise computer program code that, when executed by a processor and/or computing device, cause a computing system (such as the processors 493 and/or the client computing device 401) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 420 may also include program data 487. Data generated by the client computing device 401, such as by the program engines 482 or other modules, may be stored on the memory 420, for example, as stored program data 487. The stored program data 487 may be organized as one or more databases. In certain embodiments, the program data 487 may be stored in a database system. The database system may reside within the memory 420. In other embodiments, the program data 487 may be remote, such as in a distributed computing and/or storage environment. For example, the program data 487 may be stored in a database system on a remote computing device.

The input/output interface 495 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 494 may facilitate communication with other computing devices and/or networks and/or other computing and/or communications networks. The network interface 494 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 494 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 496 may facilitate communication and/or interaction between the other components of the system, including the one or more processors 493, the memory 420, the input/output interface 495, and the network interface 494.

As noted, the client computing device 401 also includes various program engines 482 (or modules, elements, or components) to implement functionalities of the client computing device 401, including the browser 402 and the browser extension module 404. These elements may be embodied, for example, at least partially in the program engines 482. In other embodiments, these elements may be embodied or otherwise implemented in hardware of the client computing device 401.

The browser extension module 404 may be installed to the client computing device 401 as an add-on component to a browser 402. The browser extension module 404 may function, as its name implies, as a layer of the browser 402 such that the browser extension module 404 does not independently interact with any other component, e.g., program engines/modules 482. The browser extension module 404 may operate within that portion of the memory 420 allocated by the client computing device 401 for the browser 402. In other words, the browser extension module 404 operates within the "sandbox" created by the client computing device 401 for the browser 402.

The browser extension module 404 may include a library 406 of regular expression templates 408a, 408b, etc., each regular expression template 408a, 408b, etc. corresponding and configured to a particular third-party application system 10. The browser extension module 404 may scan, as described elsewhere herein, a webpage once the webpage has been loaded within the browser 402. Upon identifying, as described elsewhere herein, a webpage as a user interface (see 103 in FIG. 1) for a third-party application system 10, the browser extension module 404 may select the regular expression template 408a, 408b, etc. from the library 406 corresponding to the identified third-party application system 10. The browser extension module 404 may identify data within the user interface 103 using a regular expression template 408a, 408b, etc. and capture relevant data from the user interface 103. The browser extension module 404 may communicate with the middleware system 16 employing a data transfer protocol of the browser 402. The middleware system 16 may send relevant data to the browser extension module 404. The browser extension module 404 may modify the user interface 103 based on the data received from the middleware system 16, as further described elsewhere. The browser extension module 404 may allow a variety of user interactions based on the data received from the middleware system 16.

Figure 5:
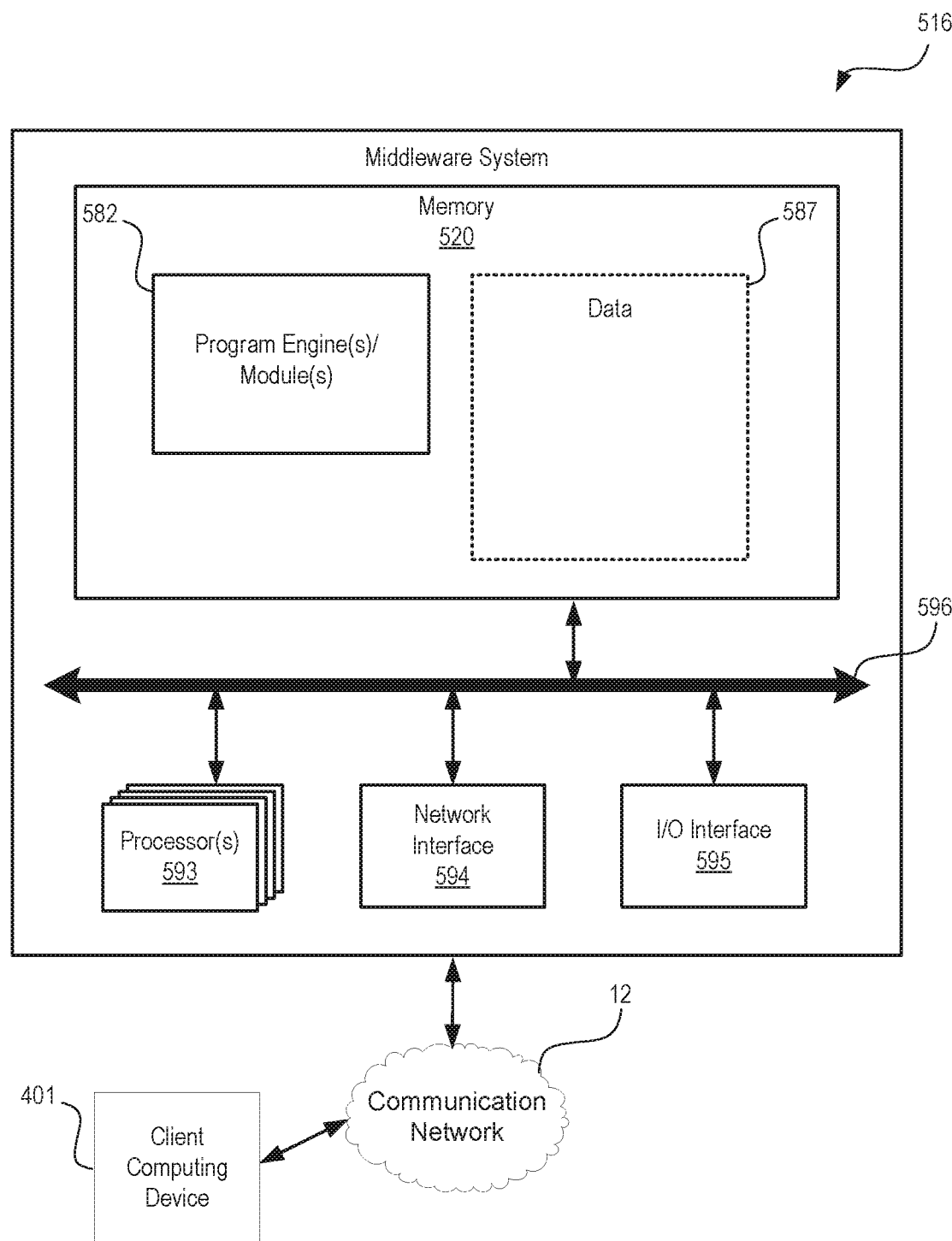
FIG. 5 is a block diagram of a middleware system, according to one embodiment.

FIG. 5 is a block diagram of a middleware system 516 according to one embodiment. The middleware system 516 can include a memory 520, one or more processors 593, a network interface 594, an input/output interface 595, and a system bus 596.

The one or more processors 593 may include one or more general purpose devices, such as an Intel®, AMD®, or other standard microprocessor. The one or more processors 593 may include a special purpose processing device, such as ASIC, SoC, SiP, FPGA, PAL, PLA, FPLA, PLD, or other customized or programmable device. The one or more processors 593 can perform distributed (e.g., parallel) processing to execute or otherwise implement functionalities of the presently disclosed embodiments. The one or more processors 593 may run a standard operating system and perform standard operating system functions. It is recognized that any standard operating system may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 520 may include static RAM, dynamic RAM, flash memory, one or more flip-flops, ROM, CD-ROM, DVD, disk, tape, or magnetic, optical, or other computer storage medium. The memory 520 may include a plurality of program engines 582 and program data 587. The memory 520 may be local to middleware system 516, as shown, or may be distributed and/or remote relative to the middleware system 516.

The program engines 582 may include all or portions of other elements of the middleware system 516. The program engines 582 may run multiple operations concurrently or in parallel with or on the one or more processors 593. In some embodiments, portions of the disclosed modules, components, and/or facilities are embodied as executable instructions embodied in hardware or in firmware, or stored on a non-transitory, machine-readable storage medium, such as the memory 520. The instructions may comprise computer program code that, when executed by a processor and/or computing device, cause a computing system (such as the processors 593 and/or middleware system 516) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 520 may also include program data 587. Data generated by the middleware system 516, such as by the program engines 582 or other modules, may be stored on the memory 520, for example, as stored program data 587. The stored program data 587 may be organized as one or more databases, including the middleware system 516. In certain embodiments, the program data 587 may be stored in a database system. The database system may reside within the memory 520. In other embodiments, the program data 587 may be remote, such as in a distributed computing and/or storage environment. For example, the program data 587 may be stored in a database system on a remote computing device.

The input/output interface 595 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 594 may facilitate communication with other computing devices and/or networks and/or other computing and/or communications networks, such as the network interface 494 of the client computing device (see 401 in FIG. 4). The network interface 594 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 694 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 596 may facilitate communication and/or interaction between the other components of the system, including the one or more processors 593, the memory 520, the input/output interface 595, and the network interface 594.

As noted, the middleware system 516 also includes various program engines 582 (or modules, elements, or components) to implement functionalities of the middleware system 516. These elements may be embodied, for example, at least partially in the program engines 582. In other embodiments, these elements may be embodied or otherwise implemented in hardware of the middleware system 516.

Communication between the client computing device 401 and the middleware system 516 may occur over any appropriate network protocol. The middleware system 516 may include one or more program engines or modules (hereafter, program engine(s)) 582 to receive, manipulate, or otherwise process data from the browser extension module (see 404 in FIG. 4) of the client computing device 401. The one or more program engine(s) 582 may parse the data received from the client computing device 401 and may execute queries, triggers, or other programmatic functions to identify data relevant to the data received from the client computing device 401. The one or more program engine(s) 582 may return relevant data to the client computing device 401 formatted to enable the browser extension module 404 to modify a user interface (see 602 in FIGS. 6A-6B and 702 in FIGS. 7A-7C). The one or more program engine(s) 582 may also interact with other program engine(s) 582 of the middleware system 516 to generate, manipulate, store and retrieve accounting data relevant to the transactions of the client account. For example, the one or more program engine(s) 582 may store date/time data for each exchange of data between the client computing device 401 and the middleware system 516, key query data from the client computing device 401, key response data from the middleware system 516, cost accounting for the middleware system 516, cost accounting for the client account, and other data to enable invoicing and other financial accounting.

The one or more program engine(s) 582 may format return data to the client computing device 401 to enable the browser extension module 404 to inject relevant data and other information into the user interface 602, 702. For example, if the data sent from the client computing device 401 to the middleware system 516 results in identifying no previously received data (e.g., a new transaction) on the middleware system 516, the one or more program engine(s)/module(s) may format the return data to enable the browser extension module 404 to modify the user interface 602, 702 by injecting HTML to display a control component to enable a client user to initiate a new report. In another instance, if the data received at the middleware system 516 correlates to a previous transaction on the middleware system 516, the one or more program engine(s) 582 may retrieve relevant data and send the relevant data to the client computing device 401 formatted such that the browser extension module 404 may modify the user interface 602, 702 by injecting the relevant data into corresponding fields within an area of the user interface 602, 702 and generating any appropriate control component(s), such as HTML link(s)/button(s), to allow further interaction.

The data message received at the client computing device 401 from the middleware system 516 may include HTML to be presented on the user interface 602, 702. For example, the middleware system 516 may send a message with HTML code to modify a section of the user interface 602, 702. More particularly, the middleware system 516 may send a message with a regular expression to identify a section of HTML in the user interface 602, 702. The message from the middleware system 516 may include an instruction to the browser extension module 404 to remove the identified section of HTML code from the user interface 602, 702 and/or to insert additional HTML code at the identified section of HTML code of the user interface 602, 702.

Examples of messages from the middleware system 516 to the browser extension module 404 to modify the user interface 602, 702 may contain data to reflect no report requested, report pending, report complete, or contents of a report, among others.

Figure 6A:
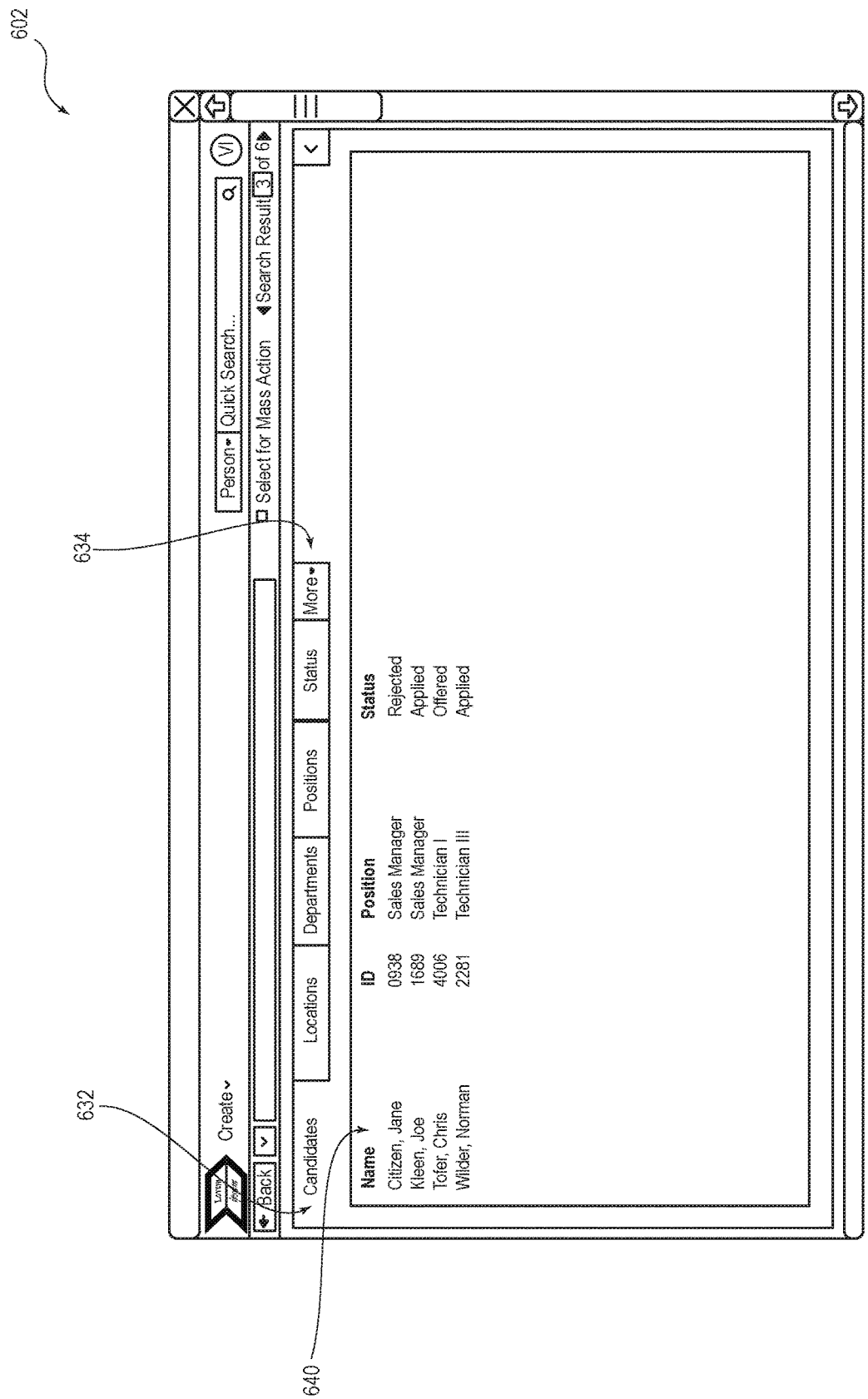
FIG. 6A is a user interface of a third-party application system without a browser extension module.

FIG. 6A is a user interface 602 of a third-party application system (such as the third-party application system 10 shown in FIG. 1) displayed on a client computing device (such as the client computing device 101 shown in FIG. 1) without a browser extension module of the present disclosure. The user interface 602 includes at least one human-readable data display region 632. The data display region 632 includes one or more control components 634 which trigger behavior specified by the third-party application system 10. In this example diagram, the data display region 632 includes a list of names 640 of applicants for employment with the client and some related data.

Figure 6B:
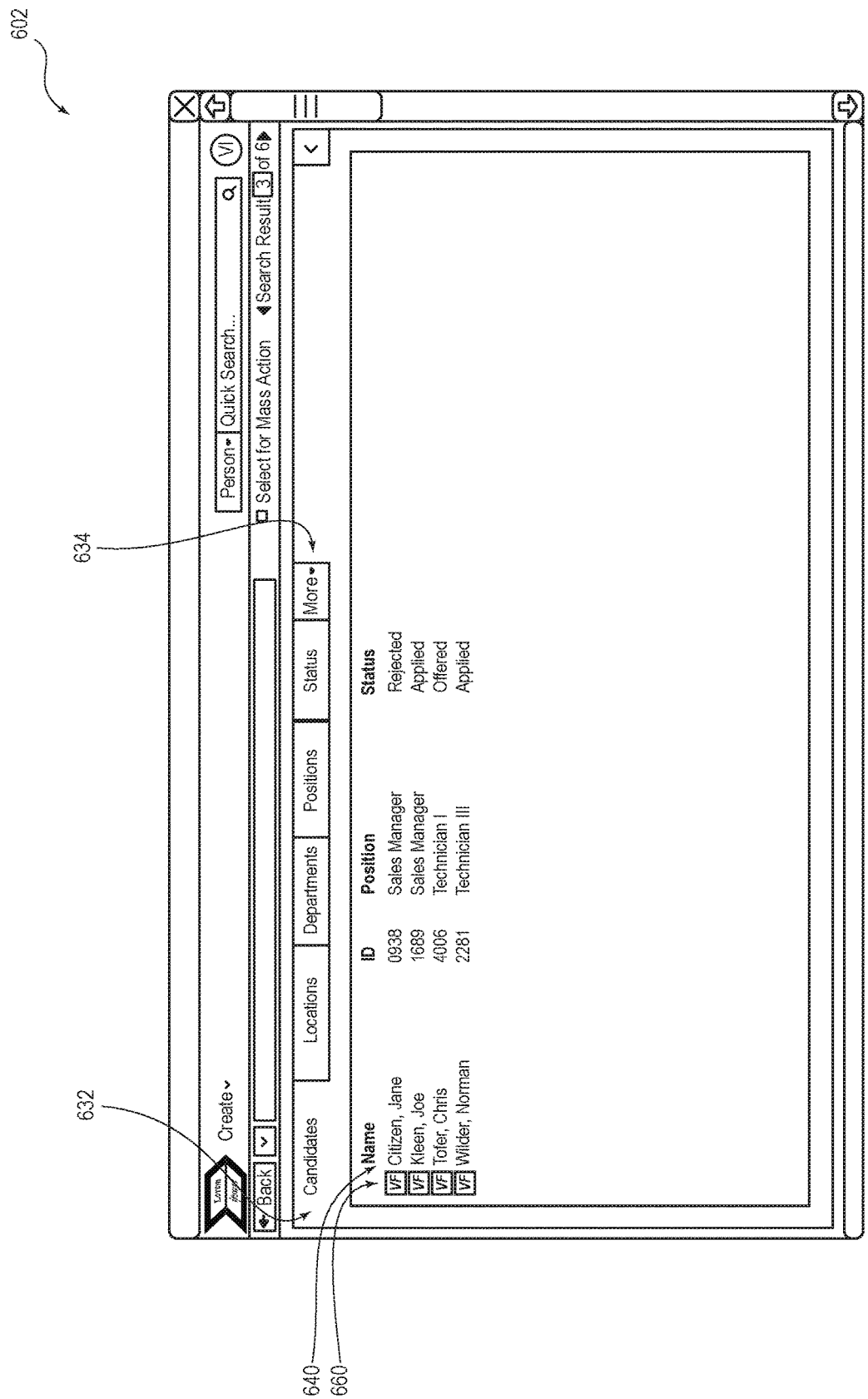
FIG. 6B is the user interface of the third-party application system of FIG. 6A with a browser extension module, according to one embodiment.

FIG. 6B is the user interface 602 of FIG. 6A with a browser extension module (such as the browser extension module 104 shown in FIG. 1), according to one embodiment of the present disclosure. An example user interface 602 for a third-party application system 10 is shown. In this example, user interface 602 includes at least one data display region 632 and at least one control component 634 to trigger behavior defined by the third-party application system 10, and a list of names 640 of applicants. The data display region 632 may include an icon 660 adjacent to each name in the list of names 640. Each icon 660 may be in icon of the browser extension module injected or otherwise inserted into the user interface 602 to enable access to functionality provided by the middleware system (see 16 in FIG. 1). The display of each icon 660 may be caused by the injection of HTML code of the third-party application system 10 by the browser extension module 104 and/or the middleware system 16. The appearance of the icon 660 may be altered by the content of the particular HTML injected corresponding to data received from the middleware system 16 for each applicant name in the list of names 640. (In an instance employing a different coding scheme than HTML, the same principles described herein apply, substituting the appropriate coding scheme language.)

By way of example, when a client user loads a webpage identified as a user interface of a third-party application system 10, the browser extension module 104 may communicate with the middleware system 16 and provide data extracted from the user interface 602 of the third-party application system 10. The middleware system 16 may return a message containing data to instruct the browser extension module 104 to inject particular HTML at targeted locations within the HTML of the third-party application system 10 so that the user interface 103 will display the icon 660 next to each name in the list of names 640. The HTML may be provided from the middleware system 16 or the browser extension module 104 according to instructions or other data from the middleware system 16. The HTML corresponding to each name in the list of names 640 may cause the icon 660 to have an appearance corresponding to some condition within the middleware system 16 relative to the individual name within the list of names 640 next to which the icon 660 appears. For example, if no report has been requested for one applicant, the HTML may cause the icon 660 to be gray. If a report has been requested for an applicant but is not yet complete, the icon 660 may be yellow, for example. If a report has been completed for an applicant, the icon 660 may be green. By causing the icon 660 to display in different colors corresponding to the particular conditions defined by the middleware system 16, a client user may be able to quickly ascertain the states of reports regarding each of the applicants in the list of names 640 without needing to view each individual record separately.

Figure 7A:
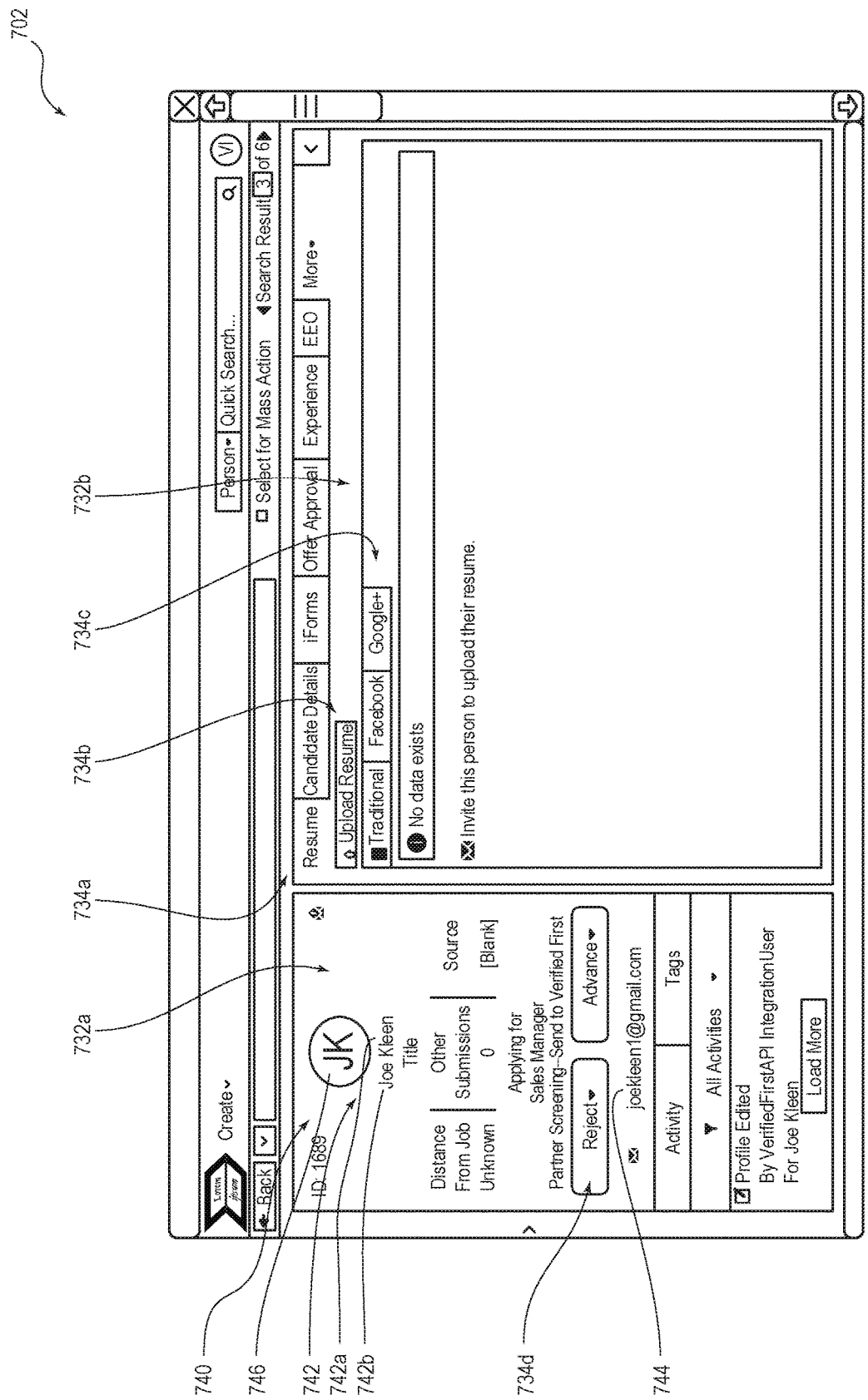
FIG. 7A is a user interface of a third-party application system without a browser extension module.

FIG. 7A is a user interface 702 of a third-party application system (such as the third-party application system 10 shown in FIG. 1) displayed on a client computing device (such as the client computing device 101 in FIG. 1), without a browser extension module. FIG. 7A may correspond to a single applicant from the list of names 640 presented by the user interface 602 in FIG. 6A or FIG. 6B. The user interface 702 may include multiple human-readable data display regions 732a, 732b, etc., as defined by the third-party application system 10. The user interface 702 may include a number of control components 734a, 734b, 734c defined by the third-party application system 10 to provide functionality for interaction with the third-party application system 10. At least one data display region 732a, 732b, etc., includes an applicant data region 740. The applicant data region 740 includes at least a name 742 of an applicant. The name 742 may comprise a last name 742a and a first name 742b. The applicant data region 740 may include other data points related to the applicant, such as a photograph 746, an email address 744, etc. Other data points may be embedded within the HTML (or other language) which is used to display information within the user interface 702, but which may be contained within HTML that does not display in the user interface 702. For example, an applicant's Social Security Account Number (SSAN), which is frequently used to aid identity, may be included in the underlying HTML as a named variable that is not displayed, possibly for security reasons.

Figure 7B:
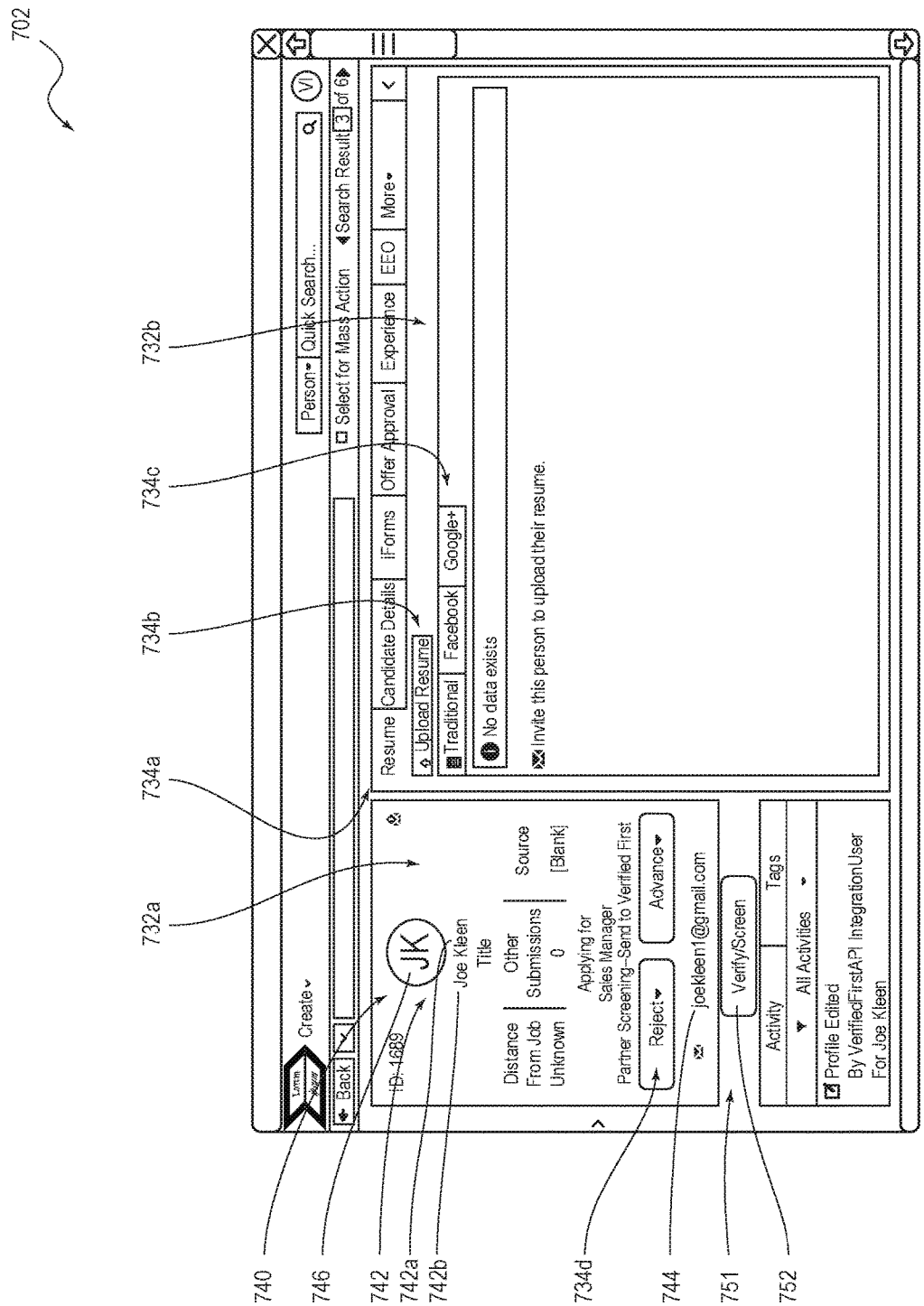
FIG. 7B is a user interface of a third-party application system similar to that of FIG. 7A and with a browser extension module, according to one embodiment of the disclosure.

FIG. 7B is the user interface 702 of FIG. 7A with a browser extension module (such as the browser extension module 104 shown in FIG. 1), according to one embodiment of the present disclosure. The user interface 702 of FIG. 7B also includes one or more human-readable data display regions 732a, 732b, etc. defined by the third-party application system 10, control component(s) 734a, 734b, etc. defined by the third-party application system 10, and at least one applicant data region 740. The applicant data region 740 illustrated includes the applicant name 742, comprising the last name 742a and the first name 742b, the email address 744, and may contain the photograph 746. The underlying HTML may also contain additional data points corresponding to the applicant, such as an SSAN.

The user interface 702 of FIG. 7B may be one with which the client user has not interacted once the user interface 702 was presented. In other words, as seen in FIG. 7B, the client user may not have clicked or otherwise interacted with any element of the user interface 702.

In FIG. 7B, the browser extension module 104 has injected HTML into the HTML of the user interface 702 to cause a control component 752 related to the middleware system 16 to be displayed at location 751 configured by the middleware system 16. In other words, the browser extension module 104 may modify the user interface 702 by inserting a control component 752, which may be a button, text or, as shown in FIG. 7B, a graphical icon, or any combination of these elements. In an embodiment using a graphical icon for the control component 752, the HTML causing the control component to display may configure (select for display) an icon which corresponds to the condition or state of a report on the middleware system 16 for the current applicant, similar to the icon 660 of FIG. 6B. The appearance and behavior of the control component 752 may be configured by a message from the middleware system 16. The client user may interact with the control component 752 to trigger one or more behaviors defined by the middleware system 16. For example, if no report regarding the current applicant has been previously requested, the control component 752 icon may be gray, and the client user may click on the control component 752 to request a report. If a report was previously requested but is incomplete, the client user may hover over the control component 752, which may trigger a display of relevant information, such as, for example, when the report was requested, or when the report is expected to be complete, etc., and the client user may click the control component 752 to view the report as currently constituted. If a report has been completed, the control component 752 icon may be green, and the client user may hover over the control component 752 which may trigger an indicator showing whether the report has been previously viewed, or when the report was completed, etc., and the client user may click the control component 752 to view the report, etc.

In at least one embodiment, the loading of the user interface 702 may trigger the browser extension module 104 to select the corresponding regular expression template (see 408a, 408b, etc. in FIG. 4) from the regular expression templates library (406 in FIG. 4). The selected regular expression template 408a, 408b, etc. may be employed by the browser extension module 104 to scan the underlying HTML to identify target data relative to the applicant and create a copy of the target data. Additionally, the browser extension module 104 may identify stylistic characteristics of the user interface 702, and may cause elements injected to or displayed with third-party application system 10 elements to appear stylistically consistent. In other words, the browser extension module 104 may employ font/font styles, colors for fonts and menus, menus (drop down, fly out, pop up, pop down, etc.), and control components or other input components similar to those used in the user interface 702 of the third-party application system 10. For example, the browser extension module 104 may match or approximately match the size, shape, color of buttons, fonts, font styles, font sizes, etc., used within the user interface 702 so as to appear stylistically consistent with the user interface 702.

Figure 7C:
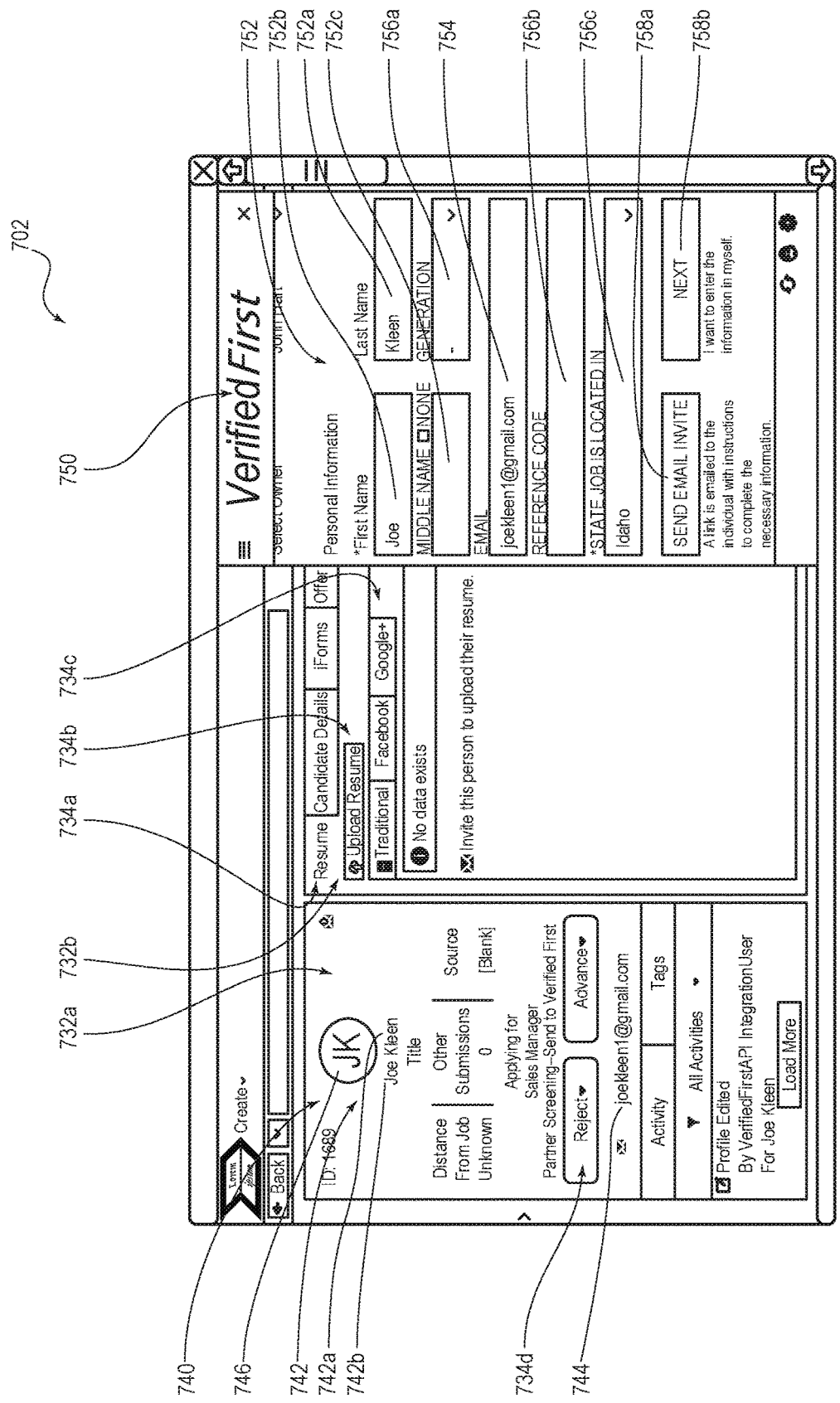
FIG. 7C is the user interface of the third-party application system of FIG. 7B including a data aggregation region of the browser extension module.

FIG. 7C is the user interface 702 of FIG. 7B with a data aggregation region 750 of the browser extension module 104. The user interface 702 of FIG. 7B is visible adjacent and "under" the data aggregation region 750. The user interface 702 includes one or more data display regions 732a, 732b, etc. and one or more control components 734a, 734b, etc. defined by the third-party application system 10, and the applicant data region 740. As in FIG. 7B, the applicant data region 740 displays the applicant name 742, comprising the last name 742a and the first name 742b, the email address 744, and the photograph or photograph placeholder 746. Additional applicant data points, such as SSAN, for example, may be contained within the underlying HTML of the third-party application system 10 as named variables that are displayed.

FIG. 7C is an example of a modification of the user interface 702 (e.g., also user interface 103 of FIG. 1) resulting from an interaction, such as a click, of the middleware system 16 control component 752 in FIG. 7B. The click of the control component 752 in FIG. 7B may trigger removal of the control component 752 and presentation of a middleware system 16 data aggregation region 750. As discussed above, the loading of the user interface in FIG. 7B may have caused a copy of the target data relative to the applicant to be made. In another embodiment, clicking the control component 752 in FIG. 7A may cause the copy of the target data to be created. When the data aggregation region 750 appears, the browser extension module 104 may populate the various fields with the corresponding data found in the applicant data region 740 and underlying HTML, if any). In other words, the last name 742a is copied to a last name field 752a, the first name 742b is copied to a first name field 752b, the email address 744 is copied to an email field 754, and other data may be copied to additional fields 756a, 756b, etc. of the data aggregation region 750. The data aggregation region 750 may include additional control components to allow the client user further interaction. For example, one control component 758a, 758b, etc. may allow the client user to manually enter additional data. Another control component 758a, 758b, etc. may allow the client user to generate an email to the applicant, an applicant screener, or some other person. Yet another control component 758a, 758b, etc. may allow the client user to send a request to the middleware system 16 to request a report, cancel a report request, request an updated report, etc.

Figure 7D:
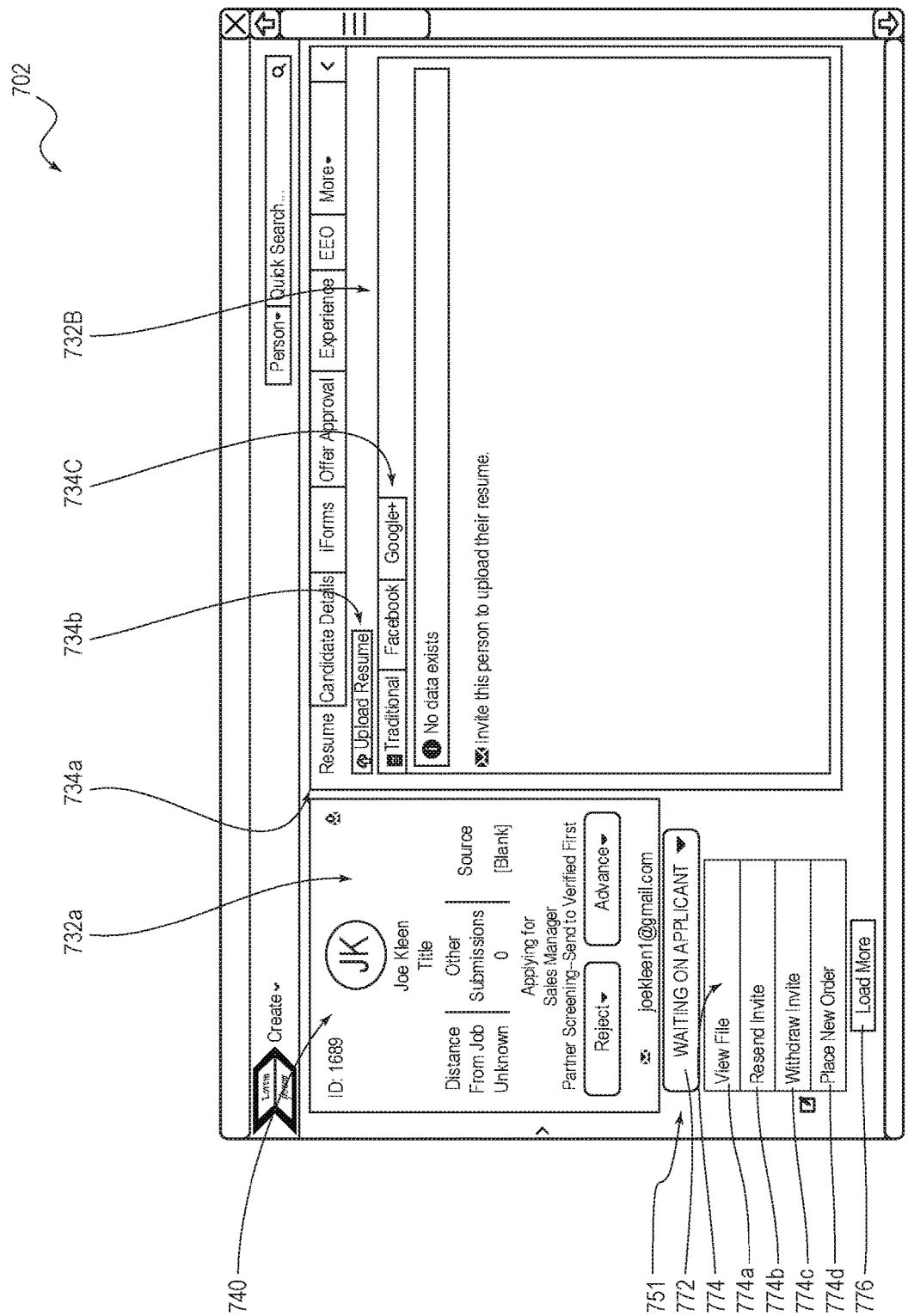
FIG. 7D is the user interface of the third-party application system of FIG. 7B with the browser extension module and at a different stage of a user interaction.

FIG. 7D is the user interface 702 with the browser extension module at a different stage or phase of operation. The user interface 702 includes the one or more data display regions 732a, 732b, etc. and third-party application system 10 control components 734a, 734b, etc., and the applicant data region 740 of FIG. 7B. FIG. 7D illustrates an instance wherein a report has been requested of, completed by, and received from the middleware system 16. When the user interface 702 for this applicant loads, the browser extension module 104 may receive a message from the middleware system 16 causing the injection of HTML into the HTML of the third-party application system 10 user interface 103 such that a control component 772 may be inserted at location 751 different from the control component 752 of FIG. 7B.

The control component 772 may be configured by the message from the middleware system 16 to have at least some different functionality compared to the control component 752 injected in FIG. 7B. For example, when the client user hovers a cursor over the control component 772 of FIG. 7D, a "pop down" menu 774 (meaning, the menu appears to pop down from the control component 772) may be displayed providing the client user a variety of interaction options as configured by the message from middleware system 16 received for this applicant. The options may be displayed as menu item control components 774a, 774b, etc. in the menu 774. One menu item 774a, 774b, etc. may cause the client file for the applicant to be displayed. One menu item 774a, 774b, etc. may generate a customizable email to invite the applicant to an interview or to schedule/reschedule an interview. One menu item 774a, 774b, etc. may generate a customizable email (or other message) to one or more appropriate client personnel (supervisors, for example) to review the applicant file, to schedule/reschedule an interview, etc. In some instances, a menu item 74*a*, 774*b*, etc. may be configured to spawn a "fly out" submenu (meaning the submenu appears to fly out to the side of menu item) with additional interaction options available to the client user.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the other examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A system for integrating and/or interfacing with a third-party application, comprising: an extension module to operate with a user interface application on a client computing device, the extension module associated with a middleware system, the extension module to, on the client computing device: extract data from a user interface of the third-party application system based on a regular expression template, the user interface operable on the client computing device to interface with the third-party application system; transmit data to the middleware system; receive information from the middleware system; and alter at least a portion of the user interface based on the information received from the middleware system.

Example 2

A system for integrating and/or interfacing with a third-party application, comprising: a middleware system to communicate with a client computing device; and a browser extension module associated with the middleware system, the browser extension module to, on the client computing device: obtain a regular expression template based on one or more characteristics of a webpage that is provided to the client computing device by the third-party application system; extract data from the webpage based on the regular expression template; transmit the data to the middleware system; receive information from the middleware system; and modify the webpage based on the information received from the middleware system.

Example 3

A system for integrating and/or interfacing with third-party applications, comprising: a browser extension module to operate with a browser application on a client computing device, the browser extension module associated with a middleware system, the browser extension module to, on the client computing device: extract data from a webpage based on a regular expression template, the webpage provided to the client computing device by the third-party application system; transmit data to the middleware system; receive information from the middleware system; and alter at least a portion of the webpage based on the information received from the middleware system.

Example 4

The system of any of Examples 1-3, wherein the extension module is further to obtain the regular expression template based on one or more characteristics of the user interface that is provided to the client computing device by the third-party application system.

Example 5

The system of any of Examples 1-3, wherein altering at least a portion of the user interface includes inserting a control component integrated into user interface.

Example 6

The system of Example 5, wherein the control component is a button.

Example 7

The system of Example 6, wherein the extension module extracts style information indicating a style of the user interface and wherein the control component is integrated into the user interface by matching an appearance (e.g., size, shape, color, font) of the control component to the style of the user interface.

Example 8

The system of Example 5, wherein the control component includes functionality for presenting a drop-down menu including a plurality of menu items, wherein selection of a menu item of the plurality of menu items initiates an interaction with the middleware system based on extracted data from the user interface.

Example 9

The system of Example 8, where the interaction with the middleware system includes opening an extension interface (e.g., within the user interface) and pre-populating a portion of the extension interface to include extracted data from the user interface.

Example 10

The system of any of Examples 1-3, wherein the user interface comprises a webpage.

Example 11

The system of Example 10, wherein the extension module is configured to alter the user by identifying a section of hypertext markup language (HTML) code of the webpage and inserting a new additional section of HTML code.

Example 12

The system of Example 11, wherein the new additional section of HTML code modifies the operation of a control component of the webpage to transmit extracted information to the middleware system.

Example 13

The system of Example 11, wherein inserting the new additional section of HTML code modifies an operation of a control component of the webpage.

Example 14

The system of Example 10, wherein the extension module is configured to modify the webpage by identifying a section of HTML code of the webpage and suppressing the section of HTML code.

Example 15

The system of Example 10, wherein the one or more characteristics of the webpage comprise a uniform resource locator (URL) of the webpage.

Example 16

The system of Example 15, wherein the data transmitted to the middleware system includes the URL of the webpage.

Example 17

A system for integrating with a third-party application, comprising: a memory including a middleware database to store data to be used to compile reports; one or more processing units configured to: receive data from a browser extension module operating with a browser application on a client computing device, the browser application presenting a webpage provided to the client computing device by the third-party application system, the data extracted from the webpage by the browser application; determine if a report is ordered based on the received data and data in the middleware database; and generate a message to send to the browser extension module based on the determination, the message to be communicated by the browser extension module to the browser for use with the webpage.

Example 18

The system of Example 17, wherein the message includes HTML code to be presented on the webpage.

Example 19

The system of Example 17, wherein the message includes HTML code to modify a section of the webpage.

Example 20

The system of Example 17, wherein the message includes a regular expression to identify a section of HTML code of the webpage.

Example 21

The system of Example 20, wherein the message includes an instruction to the browser extension module to remove the identified section of HTML code of the webpage.

Example 22

The system of Example 20, wherein the message includes an instruction to the browser extension module to insert additional HTML code at the identified section of HTML code of the webpage.

Example 23

The system of Example 17, wherein the message indicates one of: the report is complete; or the report is pending.

Example 24

A system for integrating with a third-party application system, comprising: a middleware system to communicate with a client computing device; and a browser extension module associated with the middleware system, the browser extension module to, on the client computing device: obtain a regular expression template based on one or more characteristics of a webpage that is provided to the client computing device by the third-party application system; extract data from the webpage based on the regular expression template; transmit the data to the middleware system; receive information from the middleware system; and modify the webpage based on the information received from the middleware system.

Example 25

The system of Example 24, wherein the one or more characteristics of the webpage comprise a URL of the webpage.

Example 26

The system of Example 25, wherein the data sent to the middleware system includes the URL of the webpage.

Example 27

The system of Example 24, wherein the browser extension module is configured to modify the webpage by identifying a section of HTML code of the webpage and inserting a new additional section of HTML code.

Example 28

The system of Example 27, wherein inserting the new additional section of HTML code inserts (or injects) a control component integrated into the webpage.

Example 29

The system of Example 28, wherein the control component is a button.

Example 30

The system of Example 28, wherein the browser extension extracts style information indicating a style of the webpage and wherein the control component is integrated into the webpage by matching an appearance (e.g., size, shape, color, font) of the control component to the style of the webpage.

Example 31

The system of Example 28, wherein inserting the new additional section of HTML code modifies an operation of a control component of the webpage.

Example 32

The system of Example 28, wherein the new additional section of HTML code modifies the operation of a control component of the webpage to transmit extracted information to the middleware system.

Example 33

The system of Example 24, wherein the browser extension module is configured to modify the webpage by identifying a section of HTML code of the webpage and suppressing the section of HTML code.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communication network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

The invention claimed is:

1. A system for integrating with a third-party application system, comprising:
    an extension module to operate with a user interface on a client computing device, the extension module associated with a middleware system, the extension module to, on the client computing device:
        receive a third-party identifier from a user interface of the third-party application system, the user interface operable on the client computing device to interface with the third-party application system; and
        alter at least a portion of the user interface based on the third-party identifier, wherein altering at least a portion of the user interface includes inserting a control component integrated into the user interface, wherein selection of the control component initiates an interaction with the middleware system.

2. The system of claim 1, wherein the control component is provided from the middleware system to the extension module.

3. The system of claim 1, wherein the extension module is further to obtain a regular expression template corresponding to the third-party application system from the middleware system, the regular expression template to be used to extract data from the user interface, the extracted data to be used to determine an appearance of the control component.

4. The system of claim 1, wherein the extension module is further to obtain a regular expression template corresponding to the third-party application system from the middleware system, the regular expression template to be used to extract data from the user interface, the extracted data to be used to determine an operation of the control component.

5. The system of claim 1, wherein the extension module extracts style information from the user interface indicating a style of the user interface and wherein the control component is inserted into the user interface by matching an appearance of the control component to the style of the user interface.

6. The system of claim 1, wherein the interaction with the middleware system comprises receiving information from the middleware system.

7. The system of claim 1, wherein the user interface comprises a webpage.

8. The system of claim 7, wherein the extension module is configured to insert the control component by identifying a section of hypertext markup language (HTML) code of the webpage and inserting a new additional section of HTML code.

9. The system of claim 7, wherein the third-party identifier comprises one or more of a uniform resource locator (URL) of the webpage and a data point.

10. The system of claim 9, wherein the data point comprises one or more of a name, a physical address, a social security number, and an email address.

11. A method for integrating with a third-party application system, comprising:
- receiving, at an extension module, a third-party identifier from a user interface of the third-party application system, wherein the user interface is operable on a client computing device, and wherein the extension module is associated with a middleware system and is operating with the user interface on the client computing device; and
- altering, via the extension module, at least a portion of the user interface based on the third-party identifier, wherein altering at least a portion of the user interface includes integrating a control component into the user interface, wherein a user interaction with the control component initiates a communication with the middleware system.

12. The method of claim 11, further comprising:
- obtaining, at the extension module, from the middleware system, a regular expression template corresponding to the third-party application system;
- extracting, using the regular expression template, data from the user interface; and
- determining, using the extracted data, an appearance of the control component.

13. The method of claim 11, further comprising:
- obtaining, at the extension module, from the middleware system, a regular expression template corresponding to the third-party application system;
- extracting, using the regular expression template, data from the user interface; and
- determining, using the extracted data, an operation of the control component.

14. The method of claim 11, wherein the communication with the middleware system comprises requesting information from the middleware system.

15. The method of claim 14, wherein the information requested from the middleware system comprises a report.

16. The method of claim 11, wherein the user interface comprises a webpage.

17. The method of claim 16, wherein the extension module is configured to insert the control component by identifying a section of hypertext markup language (HTML) code of the webpage and inserting a new additional section of HTML code.

18. The method of claim 16, wherein the third-party identifier comprises one or more of a uniform resource locator (URL) of the webpage and a data point.

19. A system for integrating with a third-party application system, comprising:
- an extension module to operate with a user interface on a client computing device, the extension module associated with a middleware system, the extension module to, on the client computing device:
  - receive a third-party identifier from a user interface of the third-party application system, the user interface operable on the client computing device to interface with the third-party application system; and
  - alter at least a portion of the user interface based on the third-party identifier, wherein altering at least a portion of the user interface includes inserting a control component integrated into the user interface, wherein the control component includes functionality for presenting a menu including a plurality of menu items, wherein selection of a menu item of the plurality of menu items initiates an interaction with the middleware system.

20. The system of claim 19, wherein a menu items of the plurality of menu items is based on the third-party identifier.

* * * * *